(12) United States Patent
Humfeld et al.

(10) Patent No.: US 11,117,359 B2
(45) Date of Patent: Sep. 14, 2021

(54) GRADIENT CURING OF COMPOSITE LAMINATE PARTS

(71) Applicant: The Boeing Company, Chicago, IL (US)

(72) Inventors: Keith Daniel Humfeld, Tukwila, WA (US); Samra S Sangari, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/215,385

(22) Filed: Dec. 10, 2018

(65) Prior Publication Data

US 2019/0111668 A1 Apr. 18, 2019

Related U.S. Application Data

(62) Division of application No. 14/609,960, filed on Jan. 30, 2015, now Pat. No. 10,201,959.

(51) Int. Cl.
*B32B 37/06* (2006.01)
*B32B 37/08* (2006.01)
(Continued)

(52) U.S. Cl.
CPC .......... *B32B 37/06* (2013.01); *B29C 35/0266* (2013.01); *B29C 70/30* (2013.01); *B32B 1/00* (2013.01); *B32B 3/28* (2013.01); *B32B 5/02* (2013.01); *B32B 5/22* (2013.01); *B32B 5/26* (2013.01); *B32B 37/02* (2013.01); *B32B 37/08* (2013.01); *B32B 37/1009* (2013.01);
(Continued)

(58) Field of Classification Search
CPC ..... B32B 37/06; B32B 37/1009; B32B 37/02; B32B 3/28; B32B 5/26; B32B 5/22; B32B 5/02; B32B 1/00; B32B 37/08; B32B 2038/0076; B32B 2605/08; B32B 2605/00; B32B 2260/046; B32B 2260/021; B32B 2250/20; B32B 2605/18; B29C 35/0266; B29C 70/30; B29C 2791/001; B29K 2105/243
See application file for complete search history.

(56) References Cited

U.S. PATENT DOCUMENTS 4,365,547 A * 12/1982 McClure, Jr. ........... B29C 35/04
100/325
4,385,955 A 5/1983 Doerfling et al.
(Continued)

OTHER PUBLICATIONS

Schlimbach et al., "Quickstep processing to control exothermic reaction during the manufacture of thick laminates", Plastics, Rubber and Composites, vol. 38, No. 9 pp. 374-378 (Dec. 2009) (Year: 2009).*

(Continued)

*Primary Examiner* — Michael N Orlando
*Assistant Examiner* — Christopher W Raimund
(74) *Attorney, Agent, or Firm* — Yee & Associates, P.C.

(57) ABSTRACT

Composite laminate parts are made using a gradient cured subset of fiber reinforced thermoset resin plies. A portion of the subset is cured to rigidity to thereby maintain the shape of a part layup, while other plies in the subset are actively cooled to prevent them from curing. Additional plies are laid up on the uncured plies of the subset to complete the layup. The completed layup is then fully cured.

22 Claims, 8 Drawing Sheets

(51) Int. Cl.
*B32B 1/00* (2006.01)
*B32B 5/02* (2006.01)
*B32B 5/22* (2006.01)
*B32B 5/26* (2006.01)
*B32B 3/28* (2006.01)
*B32B 37/02* (2006.01)
*B32B 37/10* (2006.01)
*B29C 70/30* (2006.01)
*B29C 35/02* (2006.01)
*B32B 38/00* (2006.01)
*B29K 105/24* (2006.01)

(52) U.S. Cl.
CPC .. *B29C 2791/001* (2013.01); *B29K 2105/243* (2013.01); *B32B 2038/0076* (2013.01); *B32B 2250/20* (2013.01); *B32B 2260/021* (2013.01); *B32B 2260/046* (2013.01); *B32B 2605/00* (2013.01); *B32B 2605/08* (2013.01); *B32B 2605/18* (2013.01)

(56) References Cited

U.S. PATENT DOCUMENTS

| | | | |
|---|---|---|---|
| 5,292,475 A * | 3/1994 | Mead | B29C 37/005 |
| | | | 264/257 |
| 7,560,060 B1 | 7/2009 | Dehart | |
| 8,128,775 B2 | 3/2012 | Maheshwari et al. | |
| 10,201,959 B2 * | 2/2019 | Humfeld | B32B 37/06 |
| 2009/0250834 A1 | 10/2009 | Huskamp et al. | |
| 2009/0297788 A1 | 12/2009 | Dull et al. | |
| 2010/0124659 A1 | 5/2010 | Nelson et al. | |
| 2011/0229720 A1 * | 9/2011 | Matsen | B29C 35/0288 |
| | | | 428/411.1 |
| 2014/0087178 A1 | 3/2014 | Arai et al. | |
| 2014/0144568 A1 | 5/2014 | MacAdams et al. | |
| 2016/0221319 A1 | 8/2016 | Humfeld et al. | |

OTHER PUBLICATIONS

Bogetti et al., "Two-Dimensional Cure Simulation of Thick Thermosetting Composites", J. Composite Materials, 25, No. 3, Mar. 1991, pp. 239-273, https://doi.org/10.1177/002199839102500302. (Year: 1991).*

Antonucci et al., "A methodology to reduce thermal gradients due to the exothermic reactions in composites processing," International Journal of Heat and Mass Transfer, vol. 45, No. 8, Apr. 2002, pp. 1675-1684.

Nawab et al., "Determination and modelling of the cure shrinkage of epoxy vinylester resin and associated composites by considering thermal gradients," Composites Science and Technology, vol. 73, Issue 1, Oct. 2012, pp. 81-87.

White et al., "Staged curing of composite materials," Composites Part A, vol. 27A, No. 3, 2006, pp. 219-227.

Office Action, dated Jul. 13, 2017, regarding U.S. Appl. No. 14/609,960, 17 pages.

Final Office Action, dated Nov. 16, 2017, regarding U.S. Appl. No. 14/609,960, 12 pages.

Notice of Allowance, dated Aug. 13, 2018, regarding U.S. Appl. No. 14/609,960, 9 pages.

* cited by examiner

GRADIENT CURING OF COMPOSITE LAMINATE PARTS

CROSS-REFERENCE TO RELATED APPLICATION

This application is a divisional of U.S. patent application Ser. No. 14/609,960, filed Jan. 30, 2015, now U.S. Pat. No. 10,201,959 issued on Feb. 12, 2019, the disclosure of which is incorporated by reference herein in its entirety.

BACKGROUND INFORMATION

1. Field

The present disclosure generally relates to processes for making composite structures, and deals more particularly with gradient curing of composite laminate parts.

2. Background

The process of curing composite laminate parts presents several challenges where the part is contoured and/or is especially thick. In order to achieve smooth inner and outer part surfaces, both sides of the part must be tooled using tools having surfaces substantially matching the intended part shape. These tools are typically expensive to fabricate, heavy, and difficult to move. The need to tool both sides of the part layup also makes the task of vacuum bagging the part more challenging.

During curing of a contoured part, the part can warp and deform from its intended contour. For example, the part may spring out to a larger angle than intended after the curing process. Accordingly, complex modeling and calculations may be required to fabricate the curing tools with contours that differ slightly from the intended contour in order to allow the part to exactly deform to the intended contour after curing. Even where the part has flat outer surfaces, the part may change in thickness and the tools may move with respect to each other during curing. In order to compensate for this tool movement, counter-weights or other mechanisms may be used to assure that the tools move in accordance with changes in the part thickness. Deformation of the part during curing may be also occur as a result of the tools and the part thermally expanding at different rates.

Curing thick thermoset parts presents still another problem caused by overheating of the middle portion of the layup produced by the exothermic chemical reaction that occurs during resin cross-linking. This overheating is similar to thermal runaway, and is due to the rate at which the heat generated by the exothermic chemical reaction escapes to the edges or surfaces of the part layup. This overheating phenomenon may cause an undesirable change in the material characteristics or properties of the middle plies, resulting in a part that does not meet specifications and/or performance requirements.

Accordingly, there is a need for a method of curing composite laminate parts that are contoured and/or are especially thick. There is also a need for a method as described above that reduces tooling requirements, simplifies vacuum bagging, and increases manufacturing throughput.

SUMMARY

The disclosed embodiments provide a method of making composite laminate parts, especially those that are thick and/or contoured, using gradient curing of part layups. Gradient curing reduces undesired part deformation and allows the use of simplified tooling, while increasing production throughput. Gradient curing according to the disclosed embodiments may be used to prevent overheating of intermediate portions of thick composite parts, thereby improving material characteristics and part performance.

According to one disclosed embodiment, a method is provided of making a composite laminate part. The method comprises laying up a subset of composite plies against a shaping tool, and curing a portion of the subset while leaving at least one surface of the subset uncured. The method further comprises laying up additional composite plies against the at least one surface, and curing the subset of plies and the additional plies. Curing a portion of the subset while leaving at least one surface of the subset uncured includes heating the shaping tool, using the shaping tool to cure the portion of the subset, and cooling the at least one surface of the subset. The cooling may be carried out by placing a cooling jacket against the at least one surface of the subset, and removing heat from the subset by passing a coolant through the cooling jacket. The cooling may also include sensing a temperature of the coolant passing through the cooling jacket, and adjusting the temperature of the coolant to a desired temperature. Curing a portion of the subset includes curing another surface of the subset to a point that the surface is sufficiently rigid to maintain a shape of the subset. The method may also include transferring the subset having the additional plies laid up thereon to a supporting tool. Curing the subset and the additional plies is performed while the composite laminate part is on the supporting tool. The method may further comprise placing one of the another tool and a caul plate on the at least one surface of the subset, and pressing the tool and the caul plate against the at least one surface.

According to another disclosed embodiment, a method is provided of making a composite laminate part, comprising laying up a first subset of composite plies on a shaping tool, whereby the first subset has a tooled surface and an un-tooled surface and curing the tooled surface of the first subset, The method further includes preventing substantial curing of the un-tooled surface of the first subset while the tooled surface is being cured. The method also comprises laying up a second subset of composite plies on the un-tooled surface of the first subset to form a laid up part, and curing the laid up part. Curing the tooled surface of the first subset includes heating the shaping tool, and transferring heat from the shaping tool to the tooled surface of the subset. Preventing substantial curing of the un-tooled surface may be carried out by cooling the un-tooled surface. Cooling the un-tooled surface includes placing a cooling jacket on the un-tooled surface, and carrying heat away from the un-tooled surface by circulating a coolant through the cooling jacket.

According to still another disclosed embodiment, a method is provided of making a composite laminate part. The method comprises assembling a composite ply layup having first and second opposite surfaces and an intermediate portion between the first and second opposite surfaces, and heating the layup to a temperature sufficient to initiate an exothermic reaction within the intermediate portion of the layup. The method also comprises cooling, after the exothermic reaction has been initiated, the layup to a temperature sufficient to prevent full curing of the first and second surfaces while allowing the exothermic reaction to continue and substantially cure the intermediate portion. The method optionally comprises adding additional plies. The method also comprises fully curing the layup. The cooling may be performed by placing first and second cooling jackets against the first and second surfaces, and passing a coolant through each of the cooling jackets to draw heat away from the first and second surfaces. The method may further comprise loading the layup into tooling, including placing first and second tools respectively against the first and second surfaces. Heating the layup may include heating the first and second tools. The method also comprises laying up at least a first set of composite plies on one of the first and second opposite surfaces. Curing the layup includes fully curing the first set of composite plies. The method may further include curing at least a portion of the first set of composite plies before the set of composite plies is laid up. Laying up the at least first set of composite plies includes laying up the first set of composite plies on a tool. Curing at least a portion of the first set of composite plies includes placing a face of the first set of composite plies in contact with the tool. Laying up the at least first set of composite plies on one of the first and second opposite surfaces includes placing the face of the first set of composite plies against the layup.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
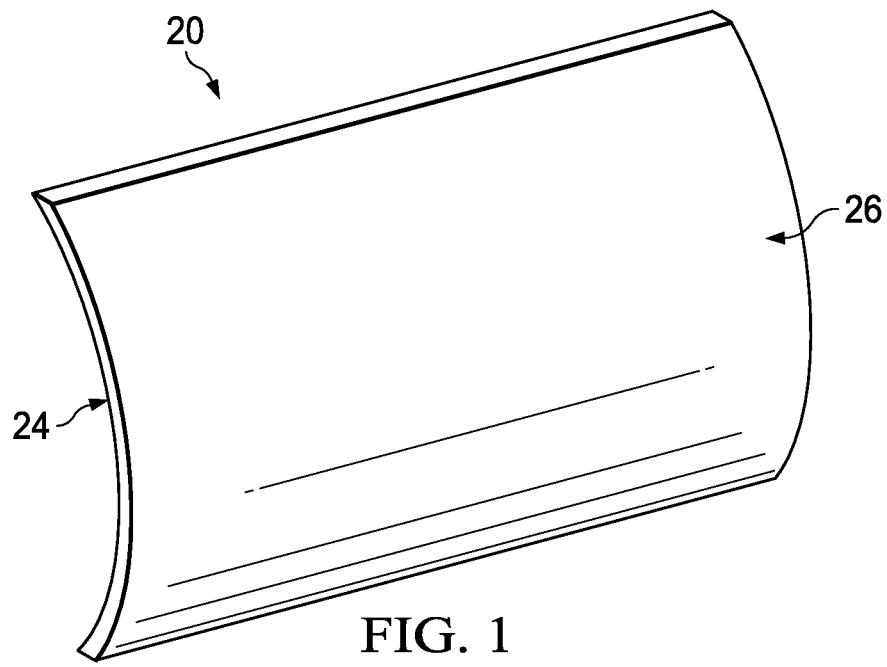
FIG. 1 is an illustration of a perspective view of a contoured composite laminate part.

Referring first to FIG. 1, the disclosed embodiments provide a method of making a composite laminate part 20 in which plies of fiber reinforced thermosetting resin are laid up into a desired part shape and thermally cured using autoclave or out-of-autoclave processing. The part 20 may have contoured inner and outer surfaces 24, 26 respectively, either or both of which may have a relatively smooth, tooled finish. In accordance with the embodiments discussed below, undesired deformation of the part layup during curing may be reduced or eliminated, and undesired overheating of intermediate portions of the part layup may be avoided using gradient curing.

Figure 2:
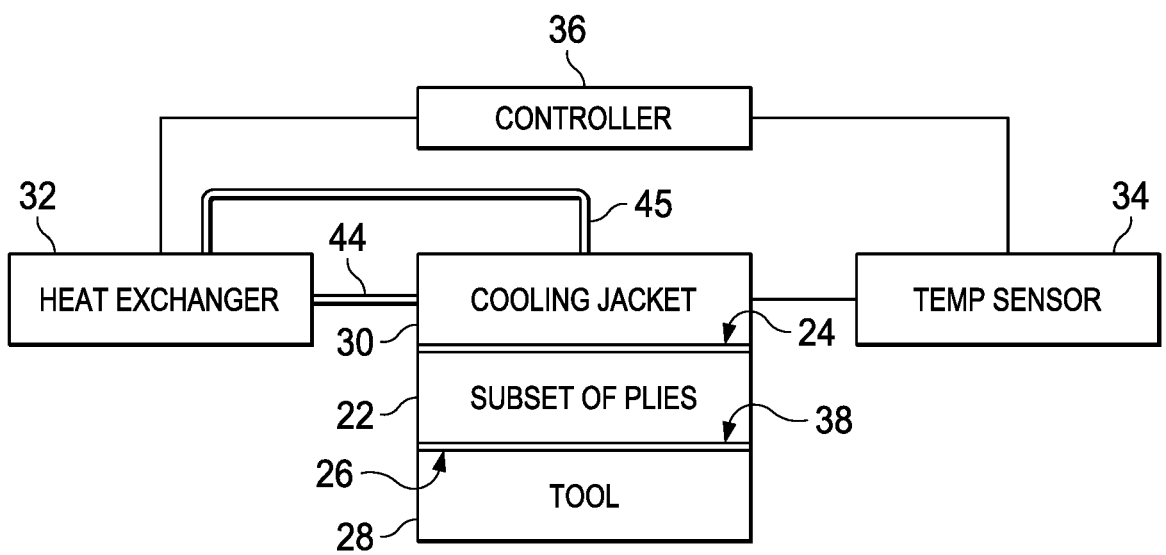
FIG. 2 is an illustration of a block diagram of a system for gradient curing of composite laminate parts, such as the part shown in FIG. 1.
Figure 3:
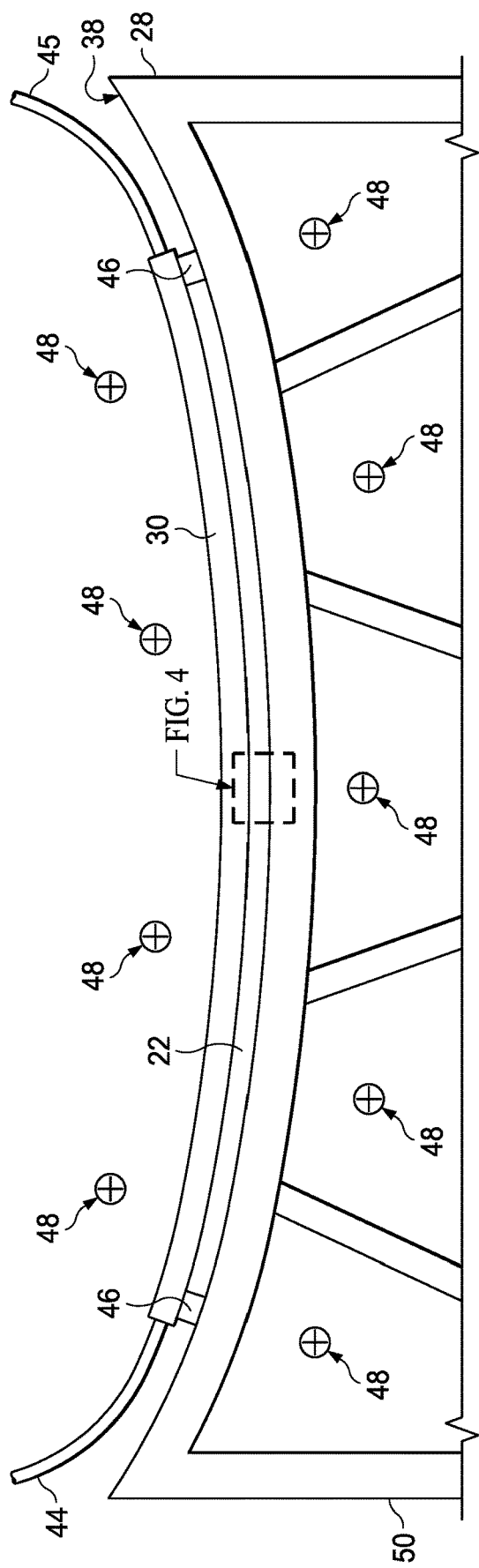
FIG. 3 is an illustration of a cross-sectional view of an arrangement for gradient curing of composite laminate parts.

Attention is now directed to FIGS. 2 and 3 which illustrate one arrangement for carrying out gradient curing of a subset 22 of composite plies. Composite plies are placed on a shaping tool 28, sometimes also referred to herein as a cure tool 28, having a tool face 38 contoured to substantially match a surface of a part, such as the outer surface 26 of the part 20 shown in FIG. 1. The cure tool 28 may be supported on a tool base 50 that is open to permit the flow of warm air 48 therethrough, as when the subset 22 of composite plies is being thermally cured in an autoclave environment. Depending on the application, the subset 22 of composite plies may be laid up on a forming tool and then transferred to the cure tool 28, or, alternatively, may be laid up directly on the cure tool 28. In this example, the outer surface 26 of the subset 22 is in direct contact with the contoured tool face 38.

A flexible cooling jacket 30 is placed on the subset 22 of composite plies in contact with the inner surface 24 of the subset 22. The cooling jacket 30 covers, and substantially conforms to the contour of the entire area of the inner surface 24. As shown in FIG. 3, a thermal insulator, formed of any suitable insulating material, is placed around the periphery subset 22, sandwiched between the cooling jacket 30 and the tool face 38. The cooling jacket 30, discussed below in more detail, has a coolant inlet 44 through which coolant may be introduced into the cooling jacket 30, and a coolant outlet 45 from which coolant may exit from the cooling jacket 30.

A temperature sensor 34 may be provided for sensing the temperature of the cooling jacket 30 and/or the coolant at the coolant outlet 45. A suitable coolant, which may comprise, without limitation, water, is circulated between the cooling jacket 30 and a heat exchanger 32 or similar device which reduces the temperature of the coolant to a desired level before being returned to the cooling jacket 30. A controller 36, such as a PC (personal computer) or a PLC (programmable logic controller) receives temperature signals from the temperature sensor 34 and controls operation of the heat exchanger 32 accordingly in order to maintain a desired temperature and or flow rate of the coolant through the cooling jacket 30.

In use, a subset 22 of composite plies is laid up on the tool face 38, and the thermal insulator 46 is installed around the perimeter of the subset 22. Next, the cooling blanket 30 is placed over the subset 22, covering and contacting the inner surface 24 of the subset 22. The tool 28 is heated, and/or is placed in a heated environment, such as an autoclave (not shown). A coolant is passed through the cooling jacket 30 as the subset 22 is being heated.

Figure 4:
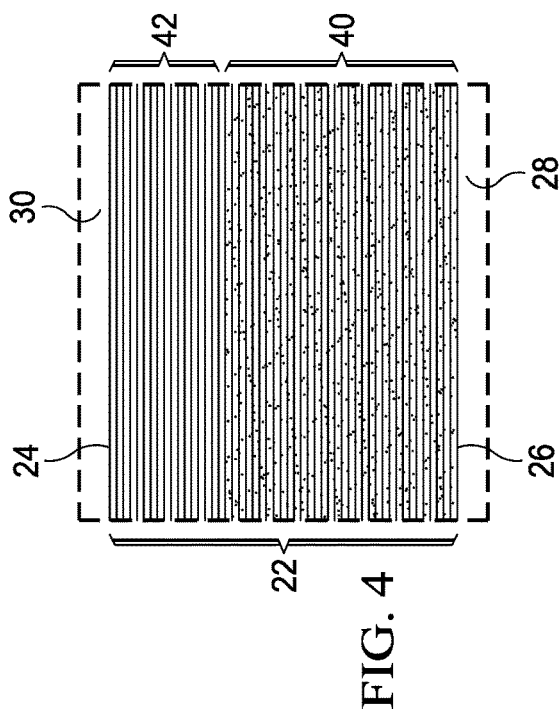
FIG. 4 is an illustration of the area designated as "FIG. 4" in FIG. 3.

Referring to FIG. 4, a first portion 40 of the plies nearest the tool 28, including the outer surface 26, is heated to a temperature that is sufficient to cure the first portion 40 of the plies, while another portion 42 of the plies farthest away from the tool 28, including the inner surface 24 remain substantially uncured as a result heat being drawn away through the inner surface 24 by the cooling jacket 30.

Curing of the outer surface 26, including the plies adjacent thereto, provides the subset 22 with a degree of rigidity that is sufficient to maintain the desired contoured part shape of the subset 22 even though the inner surface 24, including plies adjacent thereto, remain substantially uncured. The process described immediately above results in a gradient cured subset 22 in which plies in intermediate portions of the subset 22 may be partially cured, while the outer surface 26 is fully cured and the inner surface 24 is substantially uncured. As will be discussed below, additional composite plies may be laid up on the uncured inner surface 24 of the subset 22, following which the completed part layup may be fully cured using autoclave or out-of-autoclave processes. During this final, full curing phase, a caul plate or tool may be placed on the additional plies to achieve a desire shape or surface finish.

Figure 5:
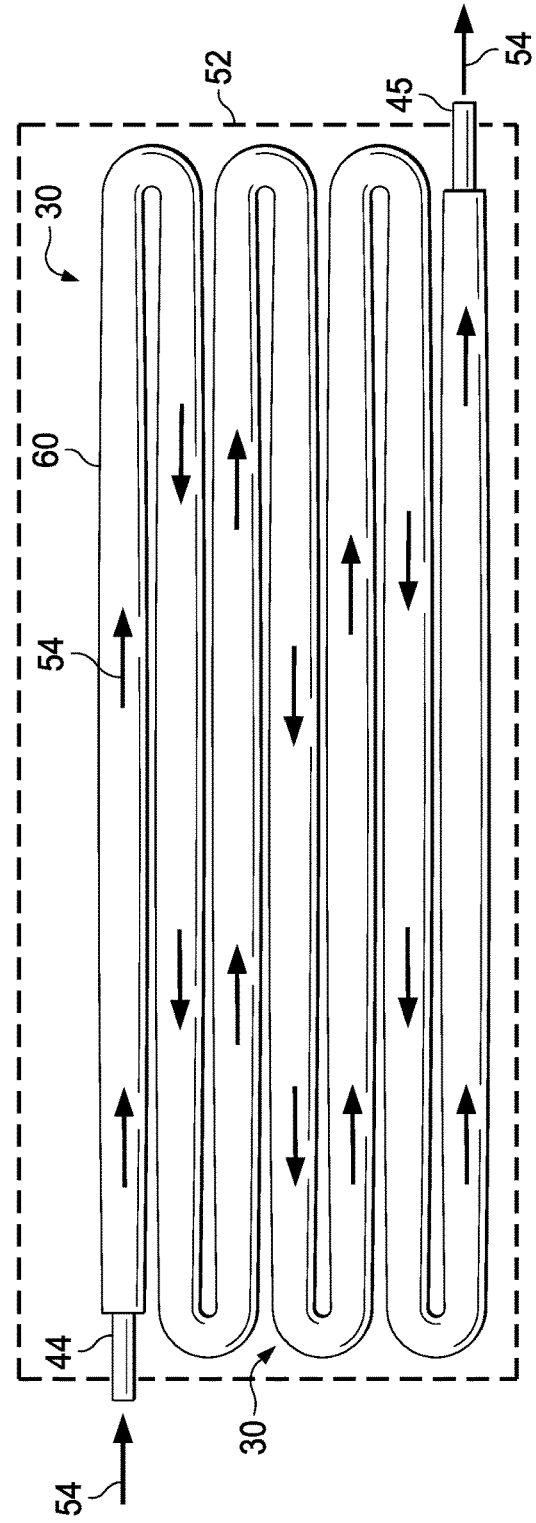
FIG. 5 is an illustration of a plan view of one embodiment of a cooling jacket forming part of the system shown in FIG. 2.

FIG. 5 illustrates one embodiment of a cooling jacket 30 comprising a flexible serpentine tube 60 through which a coolant may flow 54 in a serpentine pattern, from a coolant inlet 44 to a coolant outlet 45. The serpentine tube 60 may be made of any suitable, thermally conductive and durable material capable of flexing to conform to contoured surface of a composite part layup. The serpentine tube 60 may be contained within an outer cover 52 formed of any suitable, thermally conductive, flexible material. The outer cover allows the cooling jacket 30 to be handled, transported and placed a part layup, while constraining and maintaining the serpentine configuration of the tube 60.

Figure 6:
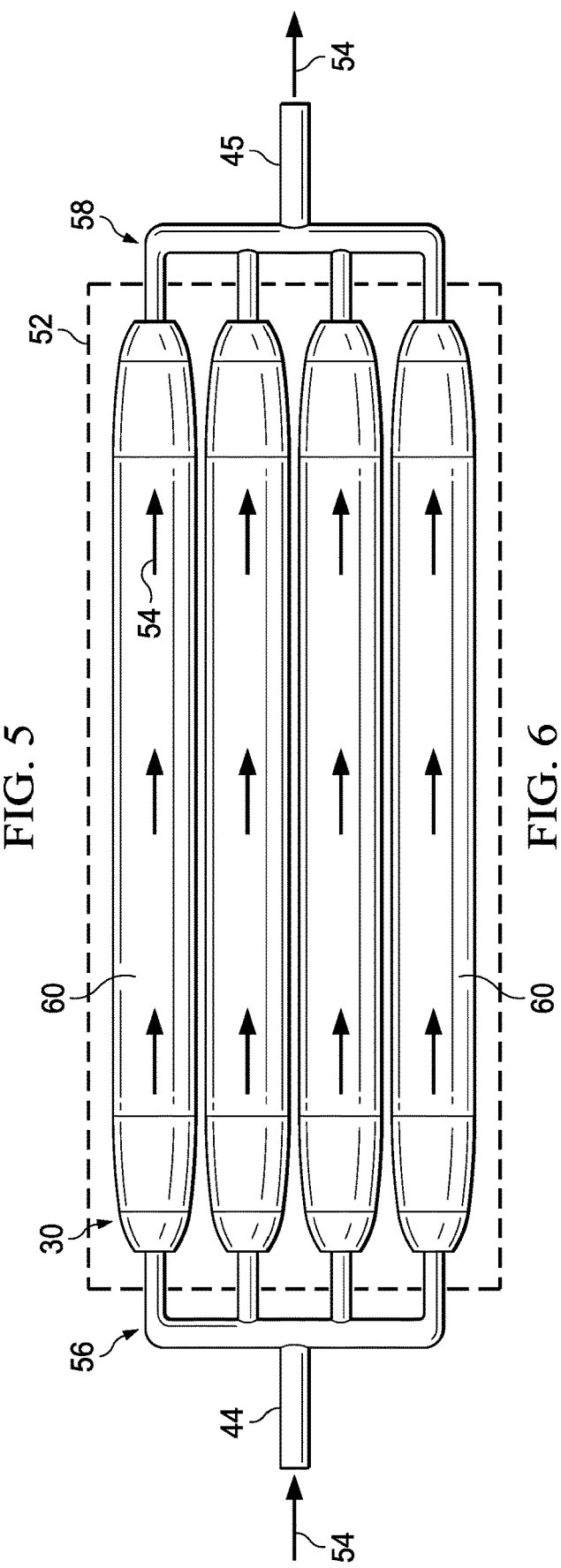
FIG. 6 is an illustration of a plan view of an alternate embodiment of the cooling jacket.

FIG. 6 illustrates another embodiment of a cooling jacket 30, comprising a plurality of substantially parallel, thermally conductive, flexible tubes 60 through which coolant may flow 54 between the opposite ends of the cooling jacket 30. The tubes 60 are held within an outer cover 52 similar to the cover 52 described above in connection with FIG. 5. One end of each of the tubes 60 is coupled through an inlet manifold to the coolant inlet, while the opposite ends of the tubes 60 are coupled through an outlet manifold 58 to the coolant outlet 45.

Figure 7:
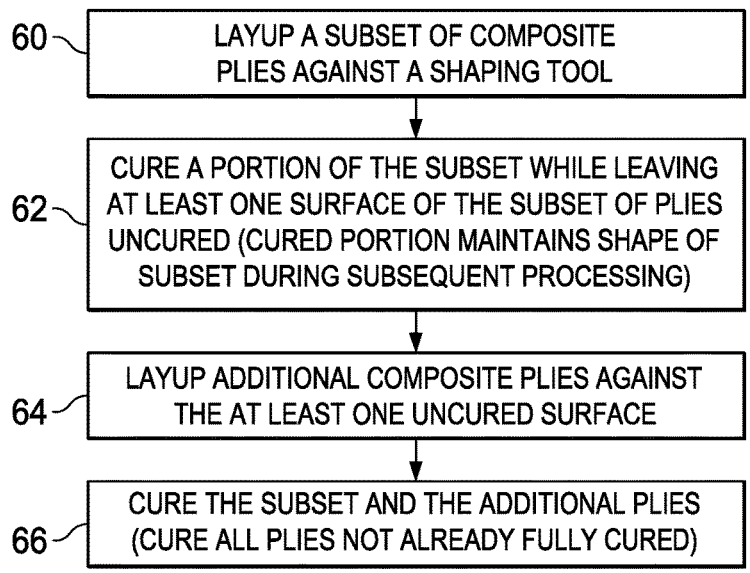
FIG. 7 is an illustration of a flow diagram of a method of gradient curing composite laminate parts.

FIG. 7 broadly illustrates one embodiment of a method of making a contoured composite laminate part using a gradient cured subset 22 of composite plies. At 60, a subset 22 of composite plies is laid up against a shaping tool 28 having a contoured tool face 38 substantially matching the desired part contour. At 62, a portion 40 of the subset 22 is substantially cured, while leaving at least one surface 24 substantially uncured. The cured portion 40 of the subset maintains the shape of the subset 22 during subsequent processing. At 64 additional composite plies are laid up against the uncured surface 24 of the subset 22. At 66, the combination of the subset 22 and the additional plies is cured, resulting in the curing of all composite plies not already fully cured in step 62.

Figure 8:
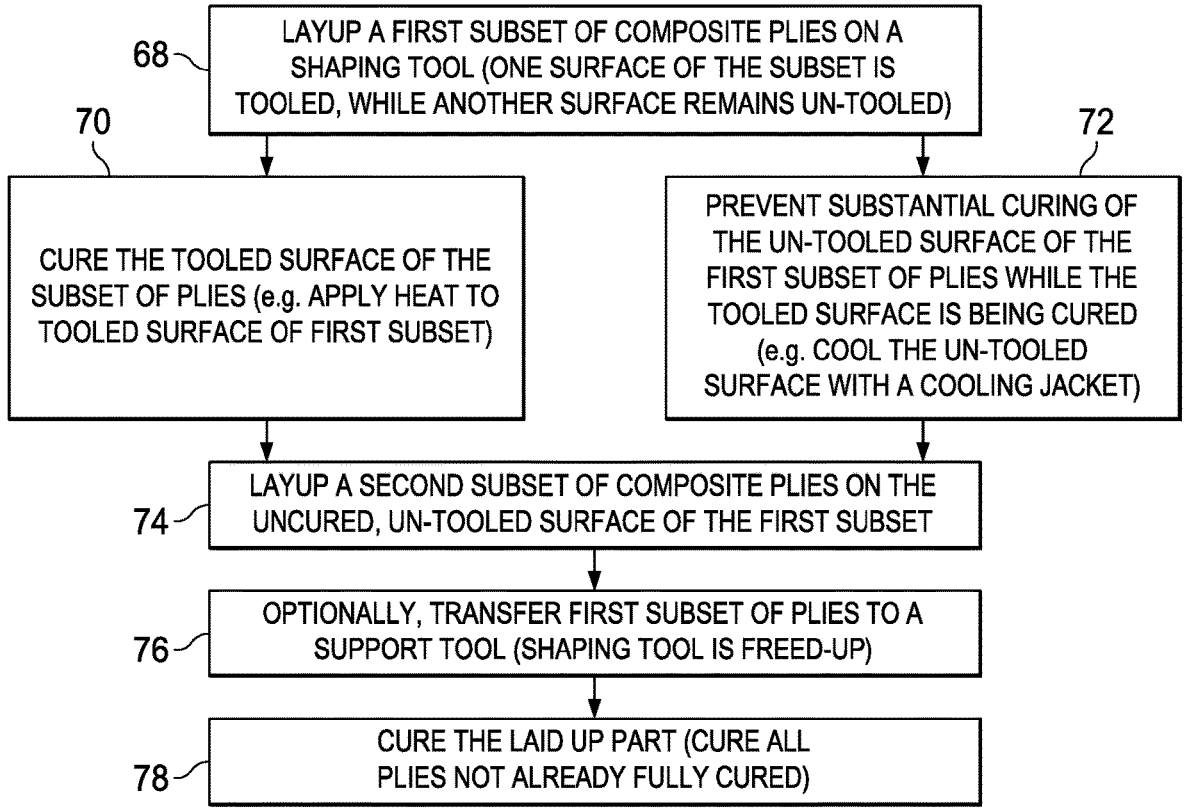
FIG. 8 is an illustration of a flow diagram of another embodiment of a method of the gradient curing.
Figure 9:
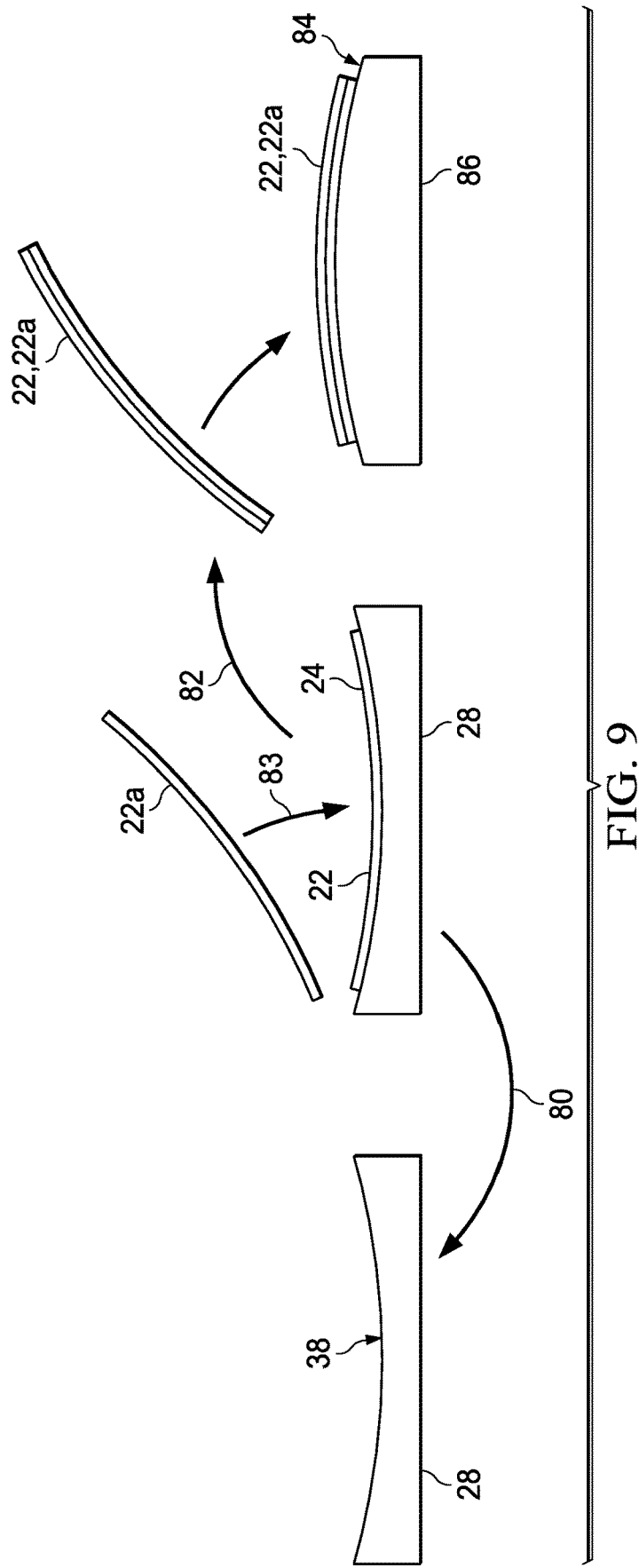
FIG. 9 is an illustration of a simplified diagram showing how a gradient cured subset of plies is transferred from a cure tool to a support tool.

Attention is now directed to FIGS. 8 and 9 which broadly illustrate an alternate embodiment of a method of making a composite laminate part using gradient cured composite plies. Beginning at step 68 shown in FIG. 8, a first subset 22 of composite plies is laid up on a shaping tool 28, such that one surface 26 of the subset 22 is tooled while another surface 24 of the subset 22 remains un-tooled. At 78, the tooled surface 26 of the first subset 22 of plies is cured, as by applying heat to the tooled surface 26. As step 70 is being carried out, substantial curing of the un-tooled surface 24 of the first subset 22 is prevented as shown at step 72, as by, for example, cooling the un-tooled surface 24 with a cooling jacket 30 or the like.

Referring concurrently to FIGS. 8 and 9, at step 74, a second subset 22a of composite plies is laid up on the uncured, un-tooled surface 24 of the first subset 22. Optionally, at step 76, the fully laid up part comprising the first and second subsets 22, 22a of plies, may be transferred from the shaping tool 28 to a simple support fixture or tool 86 having a supporting surface 84 that may or may not match the contour of the gradient cured subset 22. By transferring the part layup to a simple support tool 86 for subsequent full curing, the shaping tool 28 used for gradient curing is freed up 82, permitting it to be more quickly utilized to gradient cure additional subsets of plies, while the just-transferred part layup is subjected to full curing using autoclave or out of autoclave processing. Finally, at step 78, the fully laid up part is vacuum bagged and fully cured using autoclave or out-of-autoclave processing. Optionally, a caul plate or tool may be placed on the fully laid up part in order to achieve a desire surface finish, aid in compaction or assist in maintaining a desired shape of the part during the final curing phase 78.

Figure 10:
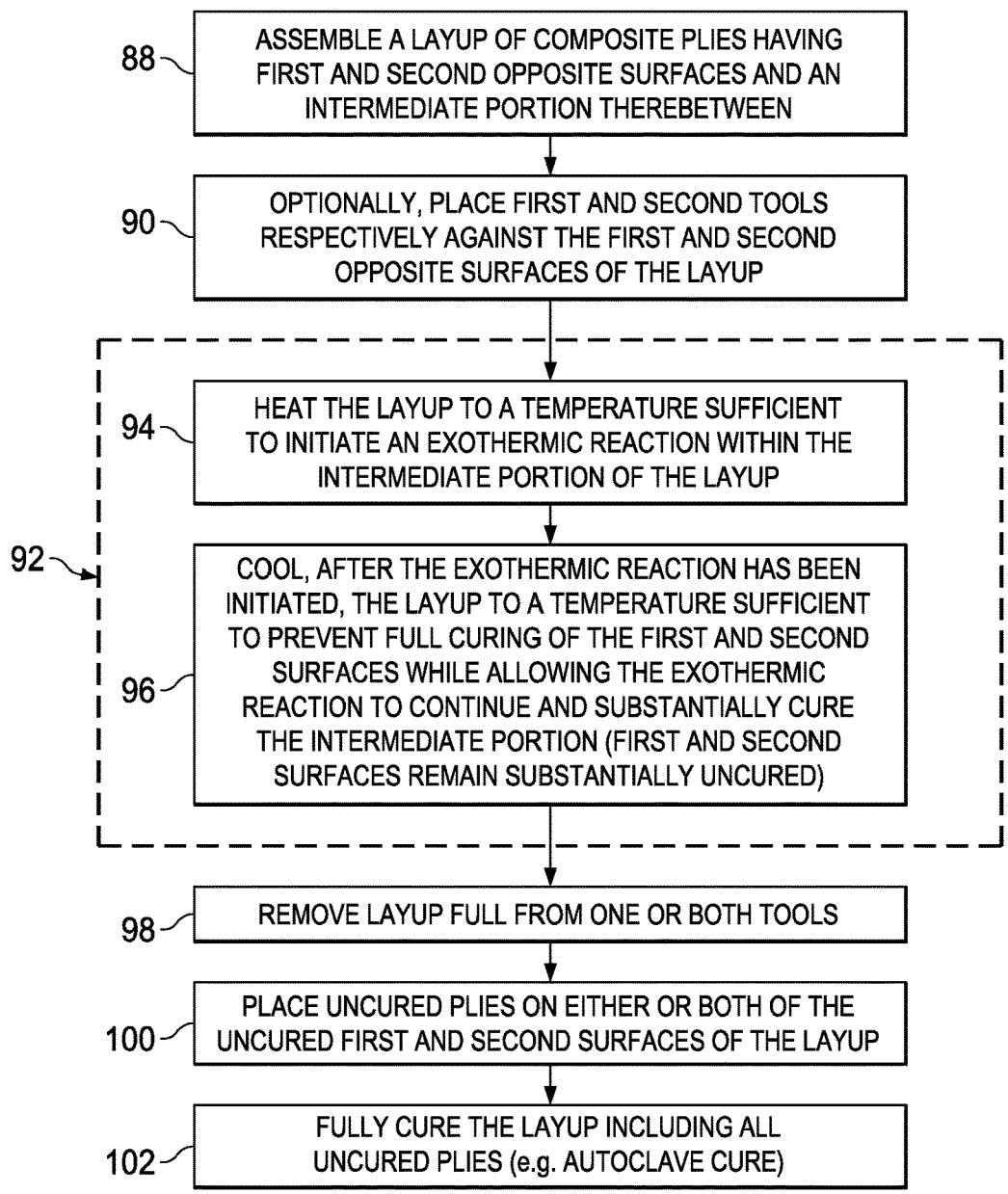
FIG. 10 is an illustration of a flow diagram of a further embodiment of a method of gradient curing thick composite parts.
Figure 11:
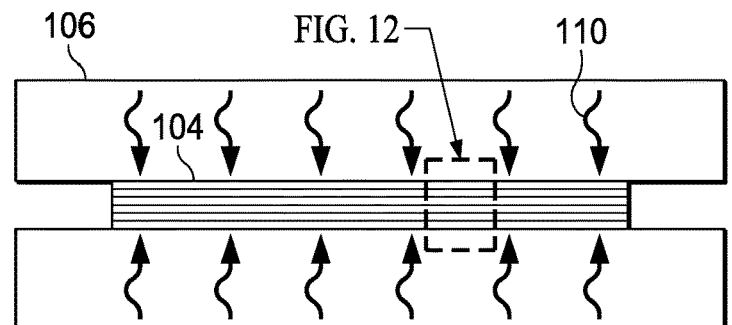
FIG. 11 is an illustration of a side view showing a thick part layup being cured between two tools.
Figure 12:
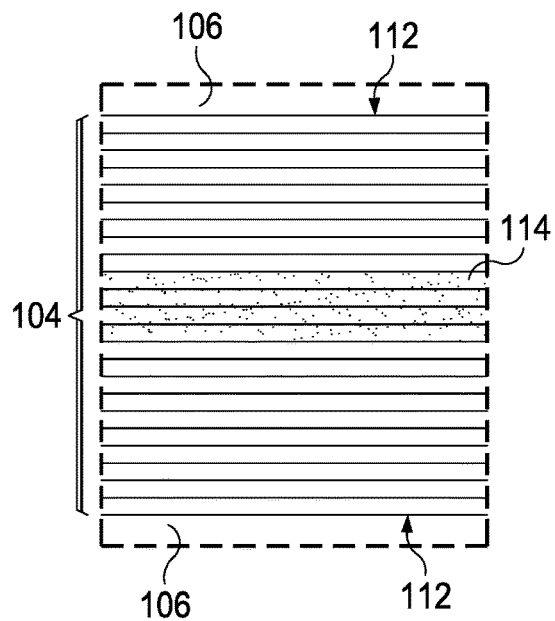
FIG. 12 is an illustration of the area designated as "FIG. 12" in FIG. 11, showing initiation of an exothermic chemical reaction in an intermediate portion of the part layup.
Figure 13:
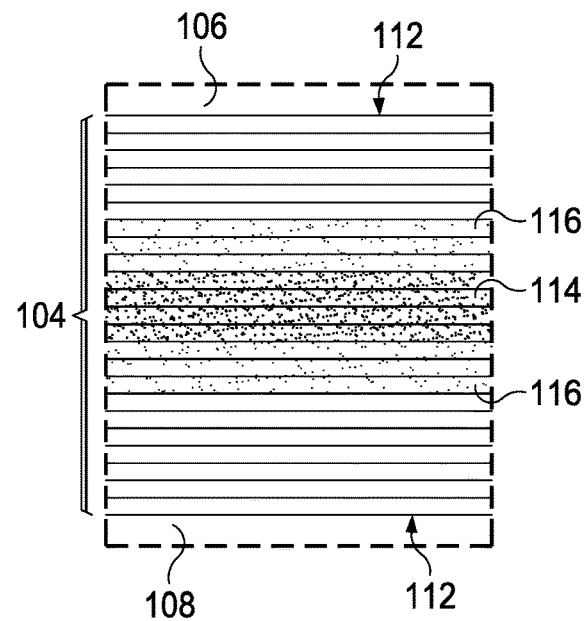
FIG. 13 is an illustration similar to FIG. 12, but showing the exothermic chemical reaction having fully cured the intermediate portion of the layup.

In some applications, composite laminate part layups, including gradient cured subsets 22 discussed previously, may be especially thick due to build-up of a large number of plies, presenting a risk that an intermediate portion of the layup may overheat as a result of the exothermic chemical reaction that takes place once cross-linking of the thermoset resin is initiated. In this connection, reference is now made to FIGS. 10-13 which broadly illustrate a further embodiment of a method of making composite laminate parts using another form of gradient curing. Beginning at step shown in FIG. 10, a layup 104 is assembled. The layup 104 comprises first and second opposite, outer surfaces 112 and an intermediate portion 114 (FIGS. 12 and 13) between the first and second outer surfaces 112.

Optionally, depending on the particular application, first and second tools 106, 108 (FIG. 11) are respectively placed against the first and second outer surfaces 112 of the part layup 104. Although the tools 106, 108 are shown as having flat tool faces, either or both the tools 106, 108 may have one or more contours substantially matching the intended shape of the part. Gradient curing 92 of the part layup 104 is then carried out as shown in steps 94 and 96. At 94, the part layup 104 is heated 110 (FIG. 11) to a temperature that is sufficient to initiate an exothermic chemical reaction within the intermediate portion 114 of the part layup 104. At 96, after the exothermic chemical reaction has been initiated, the part layup 104 is cooled to a temperature that is sufficient to prevent full curing of the first and second outer surfaces 112 while allowing the exothermic chemical reaction to continue and substantially cure the intermediate portion 114. Due to the reduction in temperature to which the part layup 104 is subjected during the exothermic chemical reaction, the first and second outer surfaces 112 remain substantially uncured, while some of the plies 116 (see FIG. 13) adjacent the intermediate portion 114 may be partially cured, thereby yielding a gradient cured part layup 104.

Figure 14:
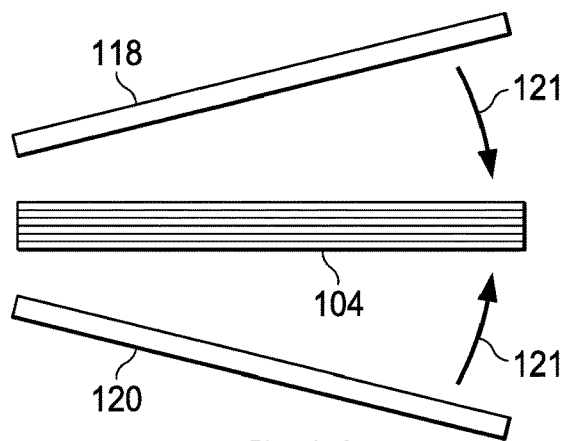
FIG. 14 is an illustration of a side view showing placement of additional plies on opposite sides of the gradient cured part layup shown in FIG. 11.
Figure 15:
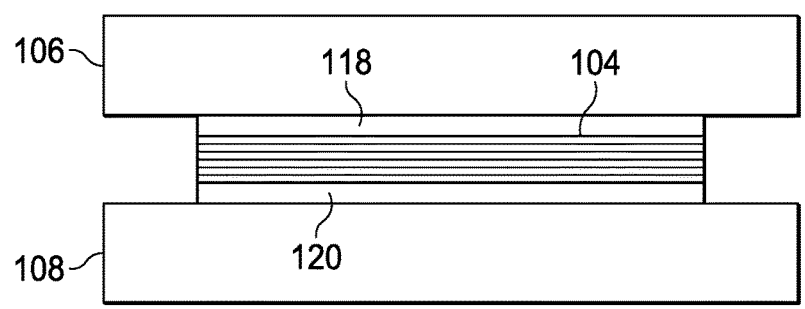
FIG. 15 is an illustration of a side view showing the fully laid up part being cured between two tools.

Referring to FIG. 14, additional uncured plies 118, 120 may be laid up 121, if desired, on either or both of the uncured, outer surfaces 112 of the gradient cured part layup 104. The uncured plies 118, 120 may comprise a gradient cured subset 22 of plies of the type previously described. Then, as shown in FIG. 15 the part layup 104 including the additional plies 118, 120 may be placed between the tools 106, 108 and subjected to a full temperature cure, thereby fully curing all uncured plies in the part layup.

Figure 16:
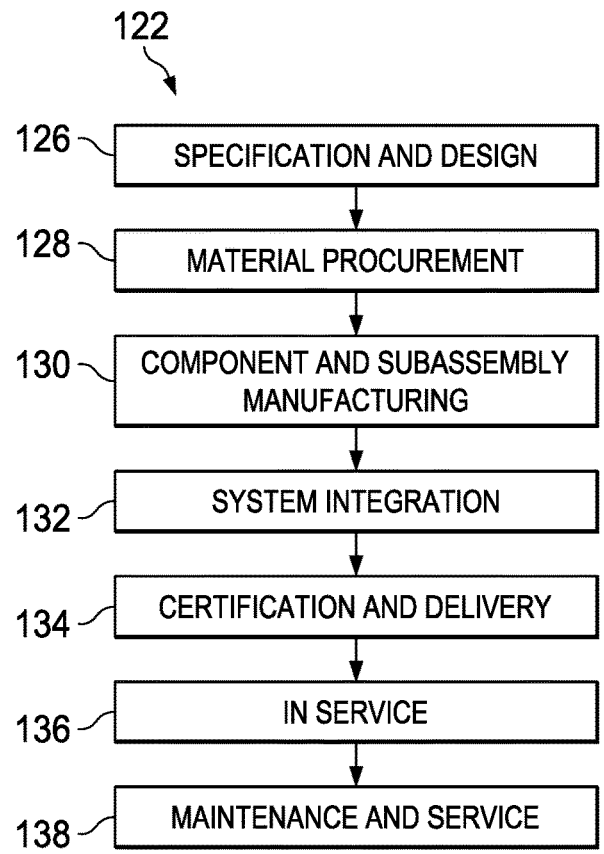
FIG. 16 is an illustration of a flow diagram of aircraft production and service methodology.
Figure 17:
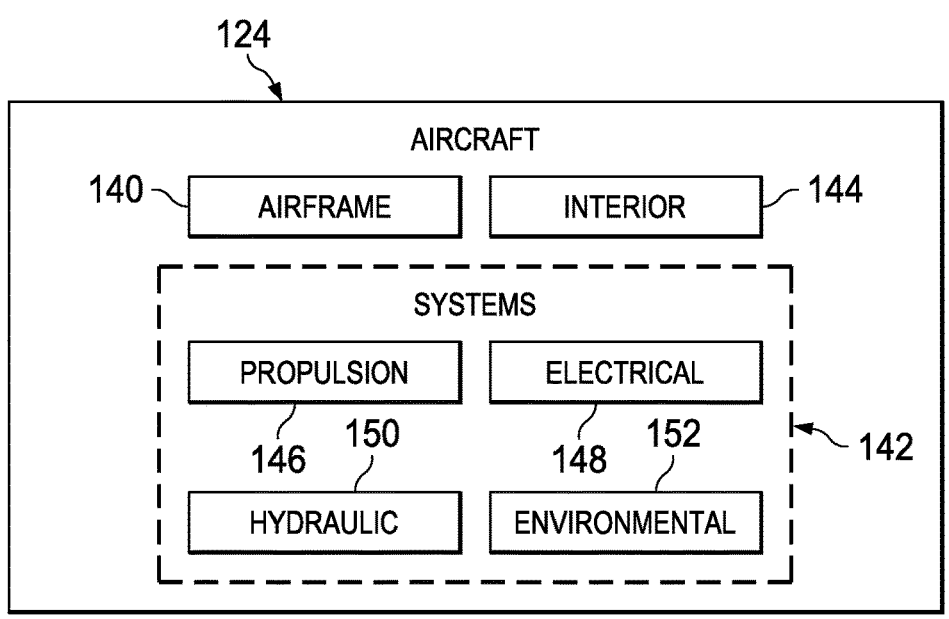
FIG. 17 is an illustration of a block diagram of an aircraft.

Embodiments of the disclosure may find use in a variety of potential applications, particularly in the transportation industry, including for example, aerospace, marine, automotive applications and other application where composite laminate structures, such as aircraft skins, may be used. Thus, referring now to FIGS. 16 and 17, embodiments of the disclosure may be used in the context of an aircraft manufacturing and service method 122 as shown in FIG. 16 and an aircraft 124 as shown in FIG. 17. Aircraft applications of the disclosed embodiments may include, for example, without limitation, skins, spars beams and other airframe components as well as interior parts. During pre-production, exemplary method 122 may include specification and design 126 of the aircraft 124 and material procurement 128. During production, component and subassembly manufacturing 130 and system integration 132 of the aircraft 124 takes place. Thereafter, the aircraft 124 may go through certification and delivery 134 in order to be placed in service 136. While in service by a customer, the aircraft 124 is scheduled for routine maintenance and service 138, which may also include modification, reconfiguration, refurbishment, and so on.

Each of the processes of method 122 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 124 produced by exemplary method 122 may include an airframe 140 with a plurality of systems 142 and an interior 144. Examples of high-level systems 142 include one or more of a propulsion system 146, an electrical system 148, a hydraulic system 150 and an environmental system 152. Any number of other systems may be included. Although an aerospace example is shown, the principles of the disclosure may be applied to other industries, such as the marine and automotive industries.

Systems and methods embodied herein may be employed during any one or more of the stages of the production and service method 122. For example, components or subassemblies corresponding to production process 130 may be fabricated or manufactured in a manner similar to components or subassemblies produced while the aircraft 124 is in service. Also, one or more apparatus embodiments, method embodiments, or a combination thereof may be utilized during the production stages 130 and 132, for example, by substantially expediting assembly of or reducing the cost of an aircraft 124. Similarly, one or more of apparatus embodiments, method embodiments, or a combination thereof may be utilized while the aircraft 124 is in service, for example and without limitation, to maintenance and service 138.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of making a composite laminate part, the method comprising:
    assembling a composite ply layup having:
        a first surface and a second surface, wherein the second surface is opposite the first surface through the thickness of the composite ply layup; and
        an intermediate portion disposed between the first surface and the second surface through the thickness of the composite ply layup;
    heating the composite ply layup to a temperature sufficient to initiate an exothermic reaction within the intermediate portion of the composite ply layup;
    after the exothermic reaction has been initiated, actively cooling the composite ply layup to a temperature sufficient to prevent full curing of the first surface and the second surface, while allowing the exothermic reaction to continue and substantially cure the intermediate portion yielding a gradient cured part layup, the gradient cured part layup comprising a through the thickness gradient of curing such that plies increase in degree of cure until reaching the intermediate portion moving from the first surface in a direction through the thickness of the composite ply layup and plies decrease in degree of cure continuing moving through the thickness of the composite ply layup from the intermediate portion to the second surface;
    performing an operation on the gradient cured part layup, wherein the operation is selected from one of: transferring the gradient cured part layup onto a supporting tool or laying up at least a first set of composite plies on one of the first surface or the second surface; and
    after performing the operation on the gradient cured part layup, fully curing the composite ply layup.

2. The method of claim 1, wherein cooling the composite ply layup includes:
    placing a first cooling jacket and a second cooling jacket against the first surface and the second surface; and
    passing a coolant through the first cooling jacket and the second cooling jacket, wherein the coolant draws heat away from the first surface and the second surface.

3. The method of claim 2, wherein cooling the composite ply layup includes:

sensing a temperature of the coolant; and
adjusting the temperature of the coolant to a desired temperature.

4. The method of claim 1, further comprising:
loading the composite ply layup into tooling, including placing first and second tools respectively against the first surface and the second surface; and
wherein heating the composite ply layup includes heating the first and second tools.

5. The method of claim 4
wherein fully curing the composite ply layup includes fully curing the first set of composite plies.

6. The method of claim 5, further comprising curing at least a portion of the first set of composite plies before the first set of composite plies is laid up.

7. The method of claim 6, wherein:
the laying up at least the first set of composite plies includes laying up the first set of composite plies on a tool;
the curing at least the portion of the first set of composite plies includes curing a face of the first set of composite plies in contact with the tool; and
the laying up at least the first set of composite plies on one of the first surface and the second surface includes placing the face of the first set of composite plies against the composite ply layup.

8. The method of claim 1, wherein curing the intermediate portion includes curing the intermediate portion to a point that the intermediate portion is sufficiently rigid to maintain a shape of the composite ply layup.

9. The method of claim 1,
wherein fully curing the composite ply layup is performed while the composite laminate part is on the supporting tool.

10. The method of claim 1, further comprising:
placing one of a tool or a caul plate on at least one of the first set of composite plies, the first surface, or the second surface; and
pressing the one of the tool or the caul plate against the at least one of the first set of composite plies, the first surface, or the second surface.

11. A method of making a composite laminate part, the method comprising:
forming a layup by laying up a first subset of composite plies on a shaping tool, whereby the first subset of composite plies includes:
a first surface and a second surface, wherein the second surface is opposite the first surface through the thickness of the layup; and
an intermediate portion disposed between the first surface and the second surface through the thickness of the layup;
placing a first cooling jacket and a second cooling jacket against the first surface and the second surface;
curing the intermediate portion of the layup by heating the layup to a temperature sufficient to initiate an exothermic reaction within the intermediate portion of the layup;
preventing substantial curing of the first surface and the second surface by actively cooling the first surface and the second surface with the first cooling jacket and the second cooling jacket while the intermediate portion is cured yielding a gradient cured part layup, the gradient cured part layup comprising a through the thickness gradient of curing such that plies increase in degree of cure until reaching the intermediate portion moving from the first surface in a direction through the thickness of the layup and plies decrease in degree of cure continuing moving through the thickness of the layup from the intermediate portion to the second surface;
laying up a second subset of composite plies on at least one of the first surface and the second surface of the first subset of composite plies of the gradient cured part layup to form a laid up part; and
curing the laid up part.

12. The method of claim 11, wherein preventing substantial curing includes cooling an un-tooled surface.

13. The method of claim 11, wherein actively cooling the first surface and the second surface includes:
carrying heat away from the first surface and the second surface by circulating a coolant through the first cooling jacket and the second cooling jacket.

14. The method of claim 13, wherein the cooling includes:
sensing a temperature of the coolant; and
adjusting the temperature of the coolant to a desired temperature.

15. The method of claim 11, further comprising:
loading the layup into tooling, including placing first and second tools respectively against the first and second surfaces; and
wherein heating the layup includes heating the first and second tools.

16. The method of claim 15, further comprising:
laying up at least a first set of composite plies on one of the first surface and the second surface; and
wherein fully curing the layup includes fully curing the first set of composite plies.

17. The method of claim 16, further comprising curing at least a portion of the first set of composite plies before the first set of composite plies is laid up.

18. The method of claim 17, wherein:
the laying up at least the first set of composite plies includes laying up the first set of composite plies on a tool;
the curing at least the portion of the first set of composite plies includes curing a face of the first set of composite plies in contact with the tool; and
the laying up at least the first set of composite plies on one of the first surface and the second surface includes placing the face of the first set of composite plies against the layup.

19. The method of claim 11, wherein curing the intermediate portion includes curing the intermediate portion to a point that the intermediate portion is sufficiently rigid to maintain a shape of the layup.

20. The method of claim 11, further comprising:
transferring the gradient cured part layup onto a supporting tool; and
wherein curing the laid up part is performed while the composite laminate part is on the supporting tool.

21. The method of claim 11, further comprising:
placing one of another tool and a caul plate on at least one of the first surface and the second surface, and
pressing the one of another tool and the caul plate against at least one of the first surface and the second surface.

22. The method of claim 11, further comprising:
curing a tooled surface of the first subset of composite plies by:
heating the shaping tool; and
transferring heat from the shaping tool to the tooled surface of the first subset of composite plies.

* * * * *